US012469054B2

(12) United States Patent
Gearhart et al.

(10) Patent No.: US 12,469,054 B2
(45) Date of Patent: Nov. 11, 2025

(54) VIDEO DIRECTORY METHOD

(71) Applicants: Elizabeth Gearhart, Chatham, NJ (US); Richard Gearhart, Chatham, NJ (US)

(72) Inventors: Elizabeth Gearhart, Chatham, NJ (US); Richard Gearhart, Chatham, NJ (US)

( * ) Notice: Subject to any disclaimer, the term of this patent is extended or adjusted under 35 U.S.C. 154(b) by 0 days.

(21) Appl. No.: 17/949,228

(22) Filed: Sep. 21, 2022

(65) Prior Publication Data
US 2023/0086901 A1 Mar. 23, 2023

Related U.S. Application Data

(60) Provisional application No. 63/246,318, filed on Sep. 21, 2021, provisional application No. 63/246,362, filed on Sep. 21, 2021.

(51) Int. Cl.
*G06Q 30/02* (2023.01)
*G06F 16/9538* (2019.01)
*G06Q 30/0241* (2023.01)
*G06Q 50/20* (2012.01)

(52) U.S. Cl.
CPC ..... *G06Q 30/0277* (2013.01); *G06F 16/9538* (2019.01); *G06Q 50/2057* (2013.01)

(58) Field of Classification Search
CPC ............ G06Q 30/0277; G06Q 50/2057; G06F 16/9538; G06F 16/735
See application file for complete search history.

(56) References Cited

U.S. PATENT DOCUMENTS

2007/0136248 A1* 6/2007 Sarid .................... G06F 16/3344
2012/0265770 A1* 10/2012 Desjardins ............. G06Q 10/06
707/748
2019/0347600 A1* 11/2019 Shen ..................... G06F 18/214

OTHER PUBLICATIONS

MyInterview.com (NPL https://web.archive.org/web/20210811192709/ https://www.myinterview.com/) (Year: 2021).*
Jun. 1, 2021, 07:00am EDT Why A Top-Notch Video Interview Matters so Much—for Companies and Candidates Alike (Year: 2021).*
MyInterview raises $5 million for its video-based job recruitment platform Catherine Shu@catherineshu / 9:00 AM EST•Dec. 9, 2020 (Year: 2020).*
University of Chicago, "Too Many Metrics", Kaitlin SpringMeier (Year: 2016).*

* cited by examiner

*Primary Examiner* — Breffni Baggot
(74) *Attorney, Agent, or Firm* — Gearhart Law LLC

(57) ABSTRACT

The invention is a video directory. The directory is a digital advertising product, having a system of presenting business owners and businesses to the public. The system is a compilation of videos on one or more platforms or listing sites that use a directory format.

20 Claims, 9 Drawing Sheets

Directory Method Presentation Module Listing Site Preferred Embodiment

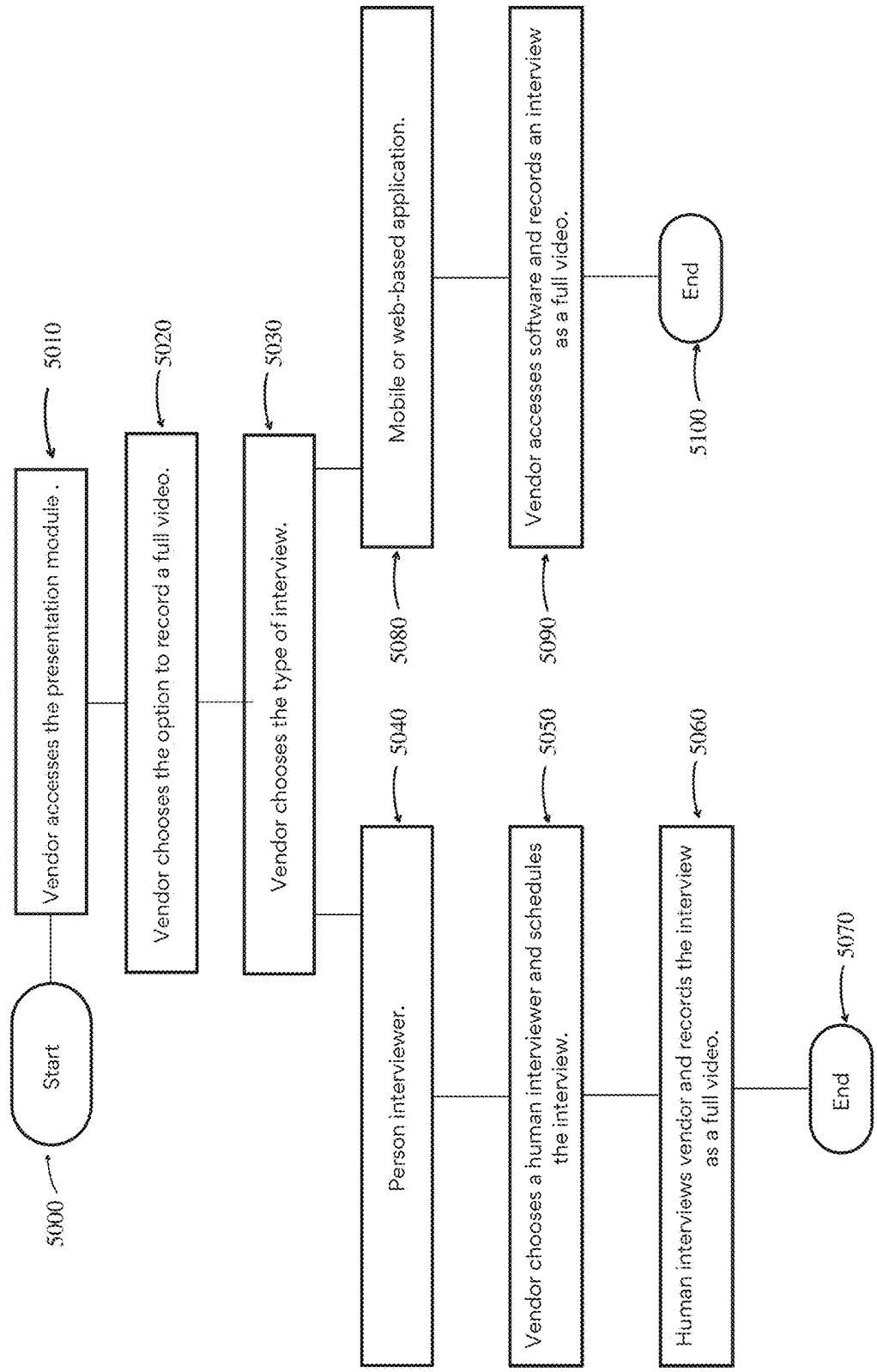

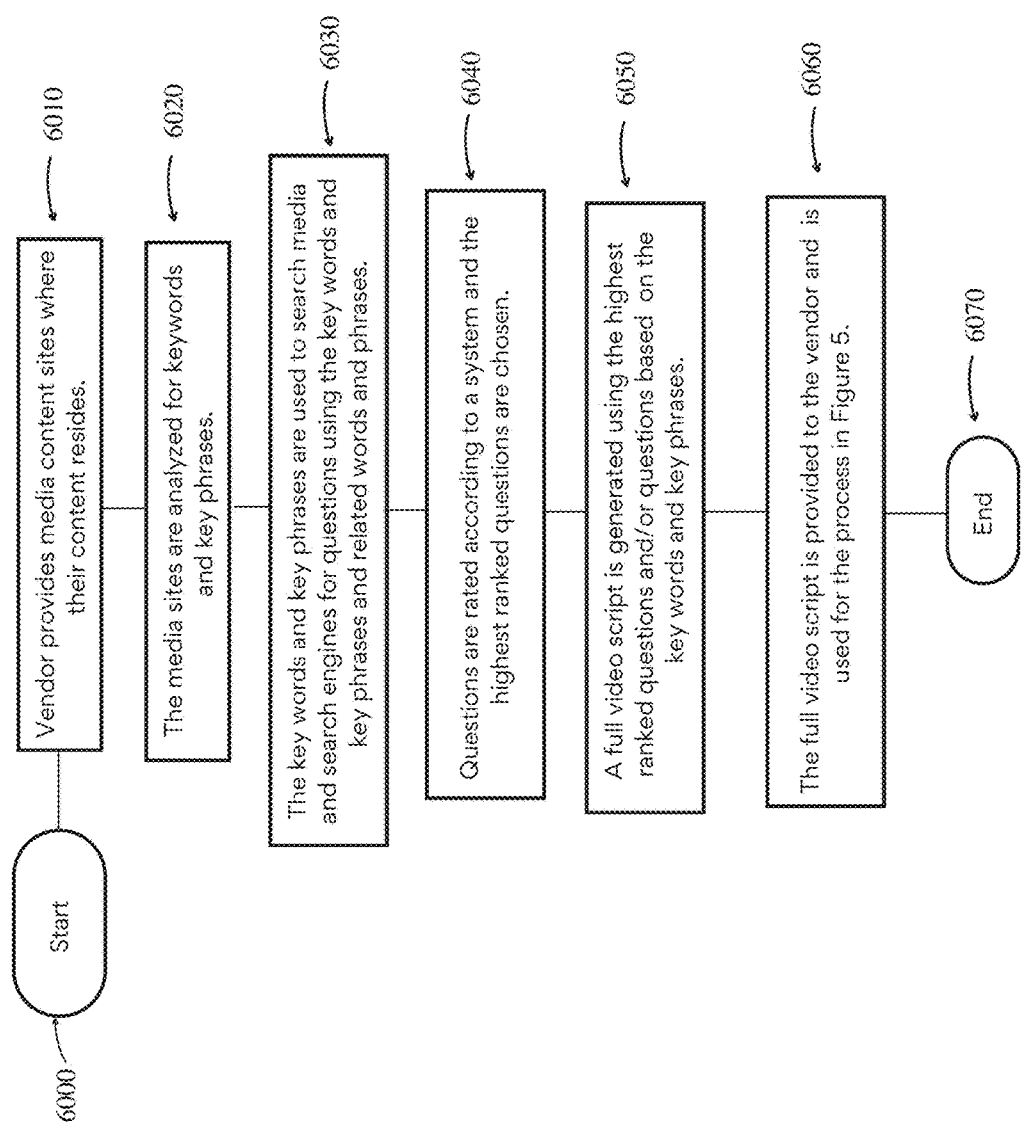

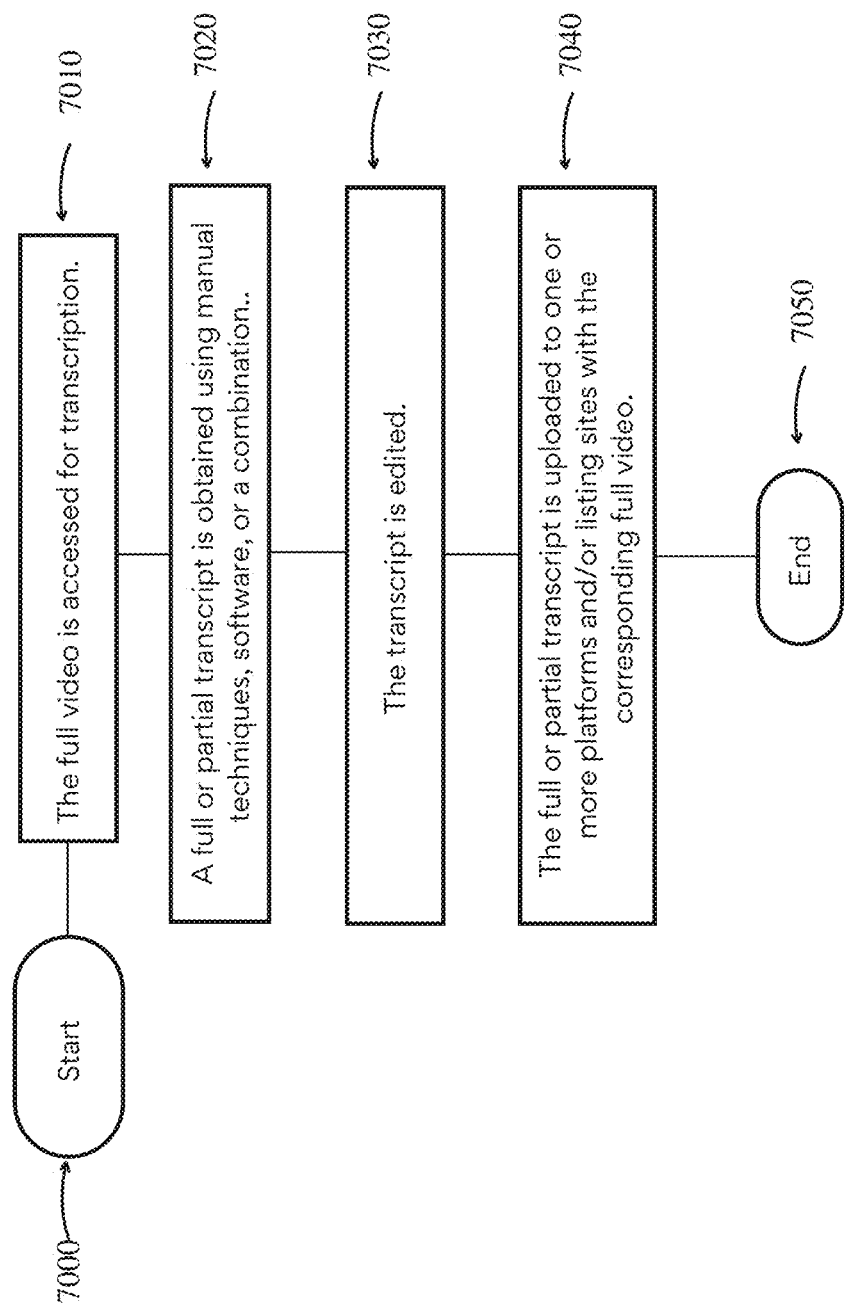

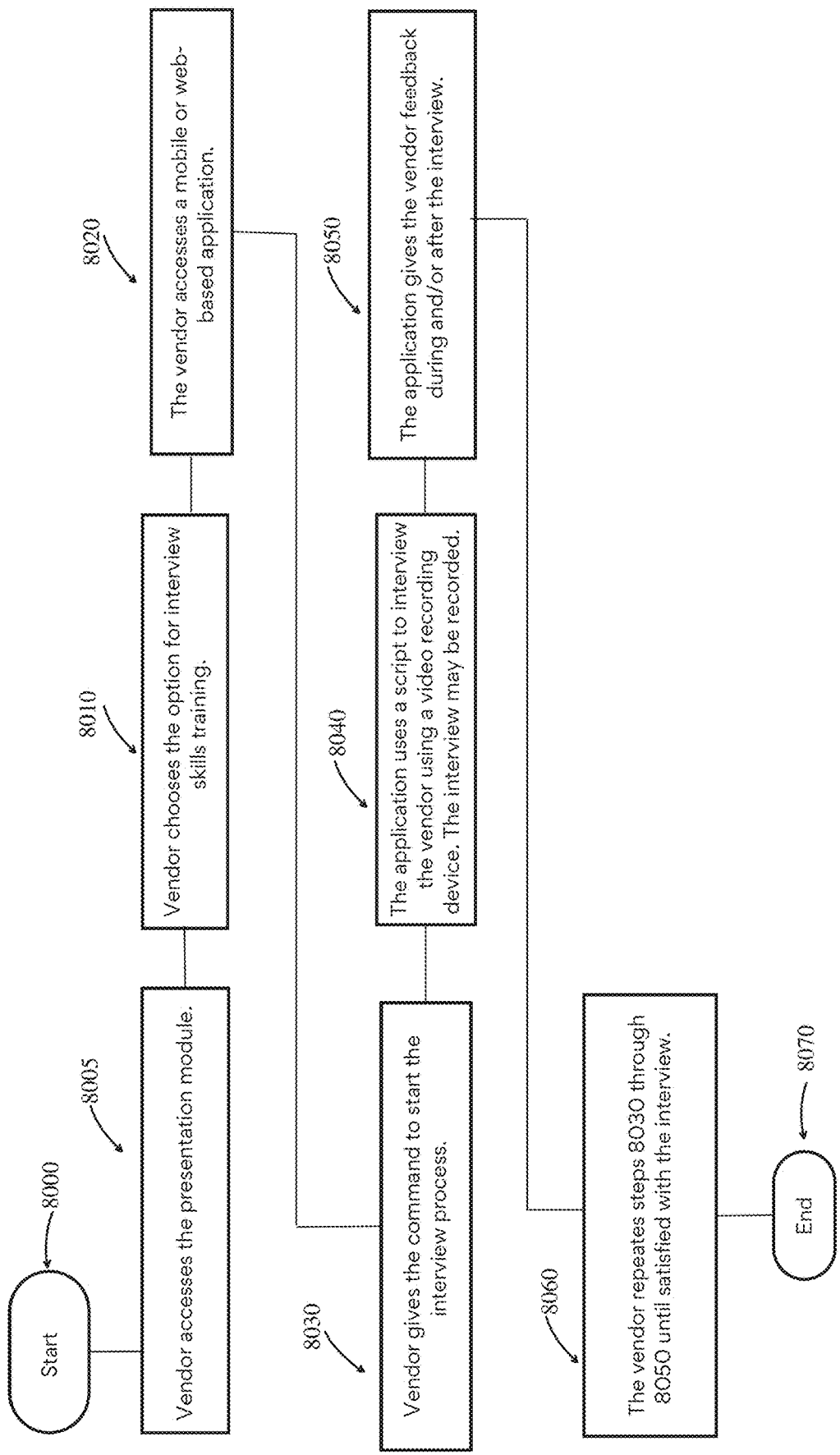

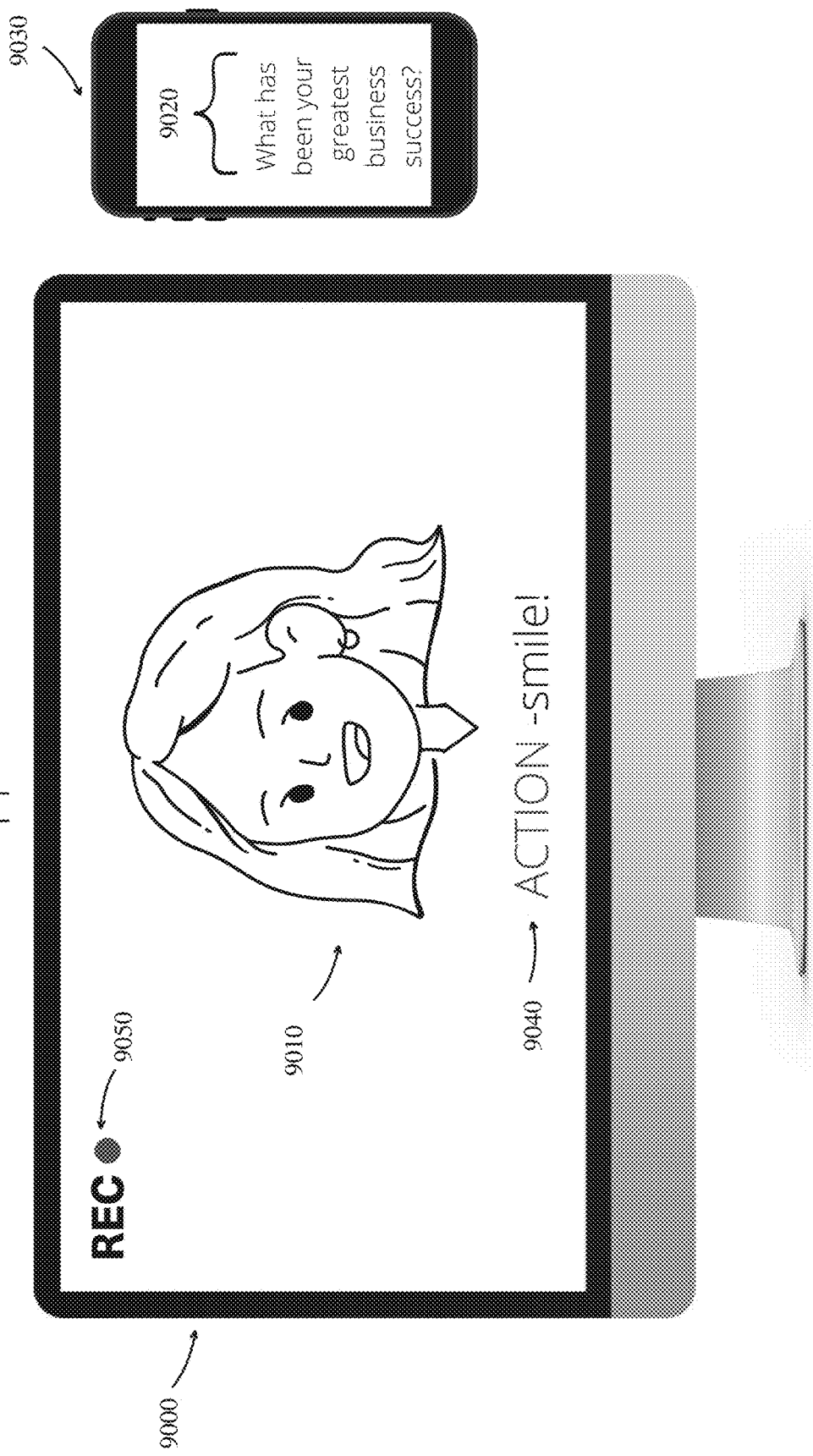
Figure 9. Directory Method Interview Skill Training Application with Interview Application

VIDEO DIRECTORY METHOD

CLAIM OF PRIORITY

This application claims priority to U.S. Provisional Application 63/246,318 and U.S. Provisional Application 63/246,362, both filed on Sep. 21, 2021, the contents of which are both hereby fully incorporated by reference.

FIELD OF THE INVENTION

The invention relates to the fields of video marketing and in particular directories.

BACKGROUND OF THE INVENTION

Consumers use various methods to search for businesses and professionals; one method is to search on the internet in various platforms or listing sites. Often the consumer is presented with a directory. Various types of business and other directories exist in different forms, but the majority of them provide limited information. The directories contain information such as the name of a professional or entity, some with a description and possibly a photo of the professional, and select information about the professional, especially for service providers. The directory entries have been listed based on various parameters, such as alphabetically or by type. The information provided doesn't convey the full sense of a prospective professional in the way that video does, and video also conveys more information much more quickly than a photo and biography. Additionally, a number of currently popular directories ask a number of questions and then require the consumer to submit their email to get information about the business or professional.

Video is becoming more prevalent in marketing and with the advancement of technology it has become easier to create videos using computers and other devices such as phones through a number of video recording software programs. Videos of business owners and professionals are being compiled on websites, but not necessarily organized and edited to aid the consumer in making a choice of business or professional to hire.

Another consideration in discovering information about a business or professional is the use of 'contact us' forms; the consumer is asked to provide their email address and possibly other information in order to find out more about a potential business hire.

The current invention solves the problems described above for the consumer, hereafter referred to as the 'end user', as well as providing a powerful method of advertising for the business owner or professional, hereafter called the 'vendor'.

The invention is a video directory, comprised of a listing of short (in a preferred embodiment, 10-30 second videos) of vendors on a listing site, each answering the same or a similar question to allow for comparisons. For vendors who choose a premium option, the short videos can link to full videos (in a preferred embodiment, 7-12 minutes). The full videos may have either been provided by the vendor or have been produced using resources on the listing site which use search engine optimization techniques in their production.

The end user can learn more about the vendor and learn it quickly through video; short videos that answer a targeted question of interest are very powerful. Additionally, the end user isn't required to surrender any personal information in order to use the site, and in some embodiments the site doesn't collect any of their information through the use of 'cookies' or other methods of culling data about end users who access a platform or site. If the end user chooses, they can enter their information in order to create an account to save information on the site for later use, such as favorite vendors, but in some embodiments they can access the vendor's information without an account.

The interviews conducted for the directory focus on questions a typical end user would ask based on searches of popular media site and search engines, therefore the end user will be able to learn more relevant information about a vendor than is available on other directories or through other means.

The current invention also solves a range of problems for the vendor whose video is placed on the site; the interview technique relieves the stress of performing solo on video, the invention includes software that helps a vendor improve and hone their video presentation skills, and it also provides marketing for the vendor. The end users who contact the vendor for products or services have presumably watched enough of the video to have a targeted interest and therefore are considered to be more qualified leads for a vendor than leads that come from other forms of marketing.

SUMMARY

The invention is a video directory comprising: a digital advertising product, wherein the digital advertising product comprises a presentation module, wherein the presentation module is configured to present a plurality of presenting vendors to one or more end users; a compilation of videos residing on one or more platforms or listing sites, wherein the one or more platforms or listing sites are in a directory format.

Vendors may be but are not limited to, small business owners, attorneys, artists, authors, musicians, athletes, professionals working in a business not their own, and any professional who would benefit from having a video and listing on a video system, are interviewed using questions that are curated by searching the vendor websites for keywords, and also by searching media, including but not limited to, digital and social media, search sites and voice-only sites for questions posed by end users containing those keywords, rating the questions by most relevant, and posing those questions to the vendors. The interview may then explore other topics as desired. This gives the vendor a marketing advantage in that their answers may be presented to end users during a search, either online with search engines such as Google, Yahoo or Bing, or by voice using devices such as Alexa or Siri, or by accessing social media sites such as Facebook or LinkedIn, among others.

In some embodiments, each vendor is asked one question, referred to herein as a 'key question' for a video clip. An example of the key question is: "what sets your business apart from your competitors' businesses?" This question and the answer may be asked as a video clip before the full interview is conducted, or may be copied from the full video into a stand-alone video clip. The video clip is listed in a directory category containing similar businesses or entities; there may be a link to the vendor's page on a listing site that includes the full video and its transcription among other information. Analytics for the full video are periodically sent to the vendor or are made available to the vendor. The video interview may be conducted by another person or by a software program or app, preferably using an Avatar. Alternately, if the vendor wants to list a pre-existing video, they may do so providing there is an appropriate video clip that can be extracted from their video. If not, they record the pertinent information. The video clips may be used for social media or other marketing where short, succinct content is desired. The vendor may also be provided a list of questions that they answer while being videotaped without an interviewer, with the resulting video being their full video.

In addition to the directory listing, vendors may avail themselves of a software program or app that trains them to improve their interviewing skills and/or to appear on video by giving prompts and feedback while they record themselves. They may also use another or that same program or app to record their videos for the platform and site, either with or without assistance, such as an Avatar that asks them questions.

Many people are uncomfortable speaking directly to a camera, therefore the interview technique is useful in making vendors feel more comfortable on video and in helping them describe their businesses or entities, as it provides for a more natural way of speaking.

For the end user, much more can be learned in a shorter period of time by watching a video than can be learned by observing a photo and reading content. The end user may watch short clips of vendors or their entities within a category of products or services on the directory site, and may compare the different vendors and/or save preferred clips or other information for later perusal. In cases where the vendor has chosen this listing option, they may also follow a link to the vendor's page on the listing site containing the full video with its full or partial transcription, in order to find out more about the vendor before contacting them. In some embodiments, all of this except for saving vendor information can be done without having to surrender any information on the part of the end user.

End users may search the directory by vendor type, by vendor name, by location, or a combination of these and/or other parameters.

In general, the invention employs techniques to boost organic search position of the video platform and website or other platform, such as the use of tags on the video site and compilation of content in the form of transcriptions on the website or other platform, with continual addition of content to both sites, as well as general SEO techniques.

It is an object of the invention to provide a video directory of vendors, such as but not limited to, businesses, artists, and other entities.

It is an object of the invention to provide a vehicle for end users to learn information quickly about a vendor.

It is an object of the invention for end users to easily compare vendors and businesses based on similar parameters and/or questions.

It is an object of the invention for end users to be able to learn about a vendor's entity and/or personality before contacting them.

It is an object of the invention for the interviewer to represent the end user when asking the vendor questions.

It is an object of the invention for vendors to showcase their entities and themselves in an easily accessible, succinct format with longer content available.

It is an object of the invention to provide vendors with an interview process that targets key phrases searched by end users.

It is an object of the invention to provide vendors with a marketing vehicle that will aid in obtaining qualified leads.

It is an object of the invention to provide video presentation skills using a software feedback program or app.

It is an object of the invention to provide an interview method using software without the need for a human interviewer.

BRIEF DESCRIPTION OF THE DRAWINGS

FIG. 5 shows the directory method full video script generation process.

FIG. 6 shows the directory method full video interview process.

FIG. 7 shows the directory method full video transcription process.

FIG. 8 shows the directory method interview skill training application.

FIG. 9 shows the directory method interview skill training application with an interview application.

DESCRIPTION OF THE PREFERRED EMBODIMENTS

The preferred embodiments of the present invention will now be described with reference to FIGS. 1-9.

In a preferred embodiment, the system has three main components; the platform for the video clip, which is a video hosting platform such as but not limited to Vimeo, and the platform for the full video, which is comprised of a video channel, such as but not limited to YouTube, and an associated listing site, such as but not limited to a website. The listing site is organized into a directory format based on established criteria. The platforms may be organized using the same categories as are used on the site, and two or three of them may be linked.

Figure 4:
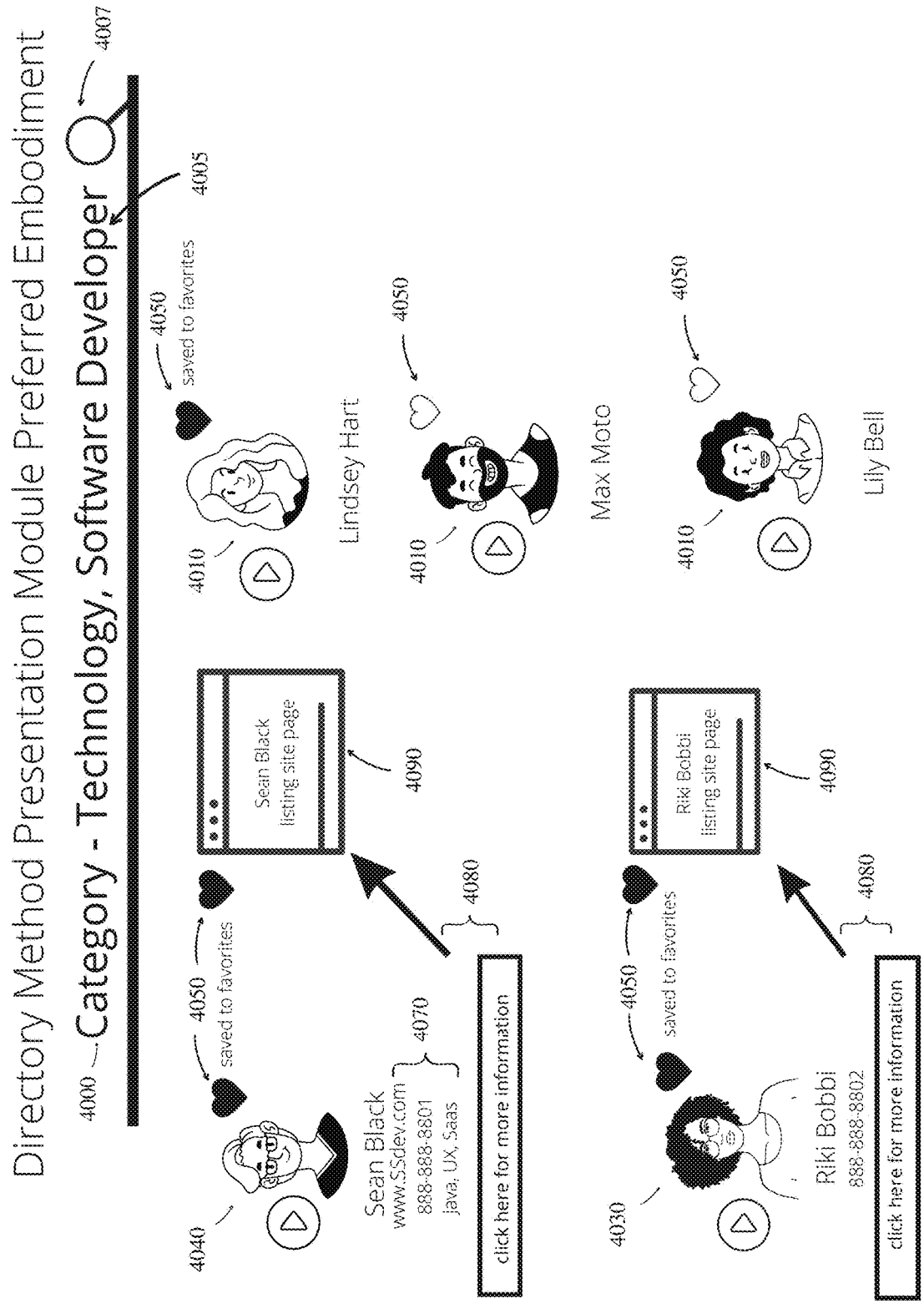
FIG. 4 shows a preferred embodiment of the directory method presentation module.

In the preferred embodiment, the directory format is classified by type, for instance business type. An example would be a classification for technology as shown in FIG. 4; technology would be the type and the vendors shown on the directory page for technology would all have expertise in the technology field type. The subcategory of software developer would be a further refinement of the type.

Definition of Key Terms

'Video Directory' is a listing of videos of vendors.

'Digital advertising product' is an advertising product that is used to promote a vendor on the internet.

'Presentation Module' is a vehicle to present a plurality of vendors.

'Vendor' is generally a business or service promoting their products or services and can include, but is not limited to, business coaches, attorneys, artists, healthcare professionals, end user product businesses, entrepreneurs, inventors, investors, tech businesses, software, life sciences, musicians, entertainers, and others.

'End user' is a person who views the site for information.

'Platform' is defined as a hosting site for videos.

'Listing site' is a site, such as but not limited to a website, where videos are listed using specified criteria.

'Directory format' is a format for listing vendors according to specific criteria.

'Full video' is defined as a full video interview or other video that is longer (1-120 minutes) than the video clip.

A "dedicated page' is a page on the listing site that contains information solely for one vendor or interviewer.

'Interview process' is the process of asking a vendor questions which the vendor answers.

'Interviewer' is a person who conducts the interview process with the vendor.

'Video clip' is a short (5-120 seconds) video that can be recorded individually or extracted from a longer video file.

'Transcript' is a written representation of a video.

'Key words' are the words and phrases people use to search for information on the internet.

A 'mobile application' is a type of application software intended to operate on a mobile phone.

A 'web-based application' is a program that is accessed over a network connection.

'Member' is a vendor, interviewer, and/or end user who has created an account on the presentation module.

'Type', as in vendor type, refers to the type of entity, such as a small business type, for instance a coaching business.

Figure 1:
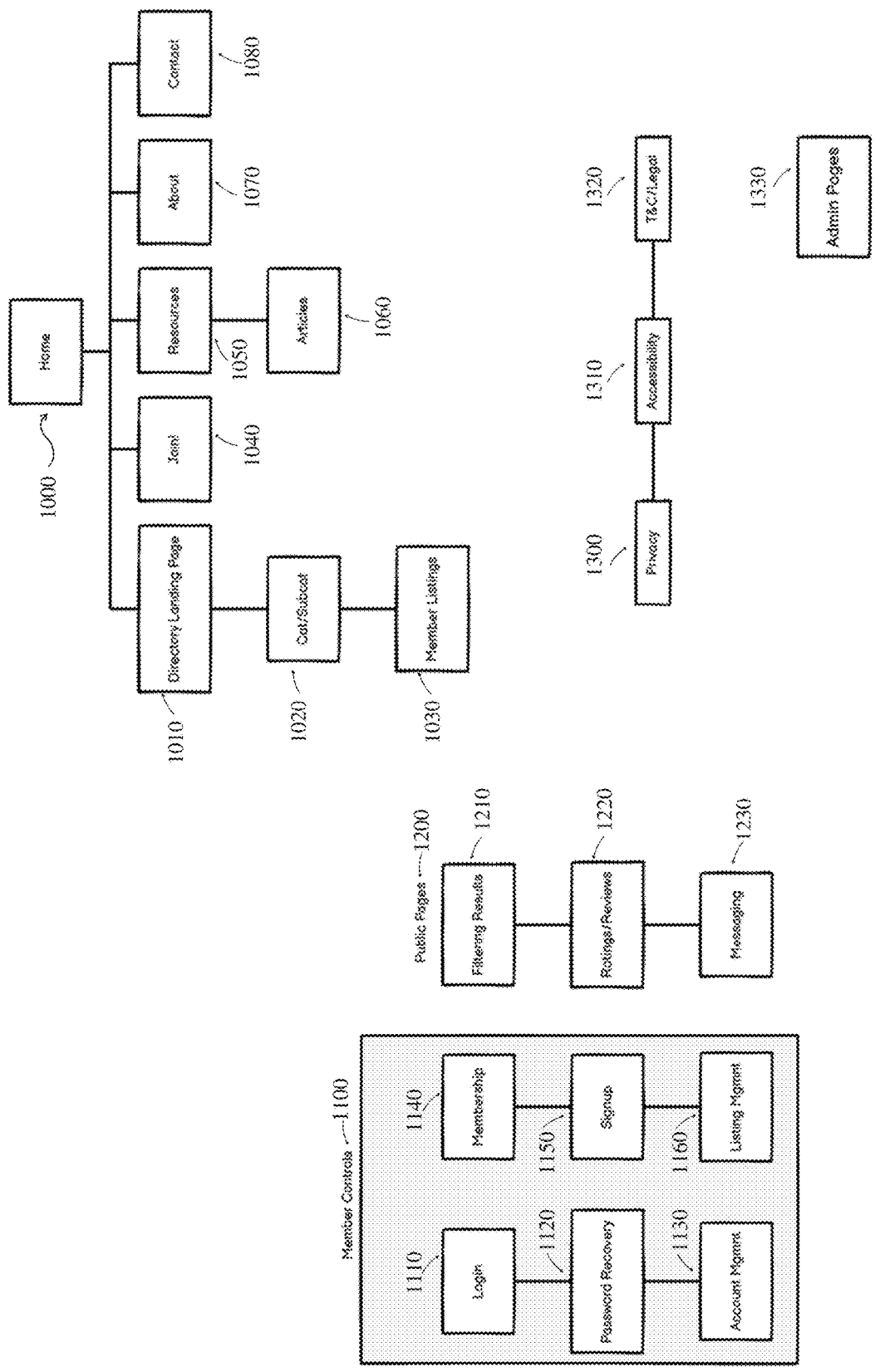
FIG. 1 shows a preferred embodiment of the directory method presentation module listing site.

FIG. 1 shows a preferred embodiment of the directory method presentation module listing site. There are three types of users of the listing site: the vendors, whose video clips, full videos, and other information may be posted to the listing site based on subscription level; interviewers, who post information on the listing site and whose purpose on the listing site is to get chosen by vendors to conduct their interviews; and end users, who visit the site to view the information.

In this embodiment, the listing site is a website that encompasses a number of elements. The listing site contains a home page 1000 that introduces a vendor, interviewer, and end user to the presentation module and contains a menu that shows the listing site navigation. The home page may also contain other elements, such as but not limited to, drop-down menu links to specified pages, for instance the category pages, an introduction, featured videos, backlinks, resource articles, membership benefits and links, and reviews.

The directory landing page 1010 contains links to popular or featured categories and popular or featured listings. The page will also include introductory information and may include a 'join' block and link.

The category/subcategory page 1020 lists all vendors and in categories and/or sub-categories based on vendor type. The page will also include introductory information and may include a 'join' block and link.

The member listings page, 1030, provides a number of options. At a minimum for vendors, they receive a link to upload a video clip and other information, such as but not limited to, their name, and to choose a category in which to list their video clip. Vendors may choose more than category. Premium options allow more data to be placed on the listing site as described below. Vendors choose their option by choosing a subscription level.

Interviewers may be provided a link from the member listings page 1030 to a dedicated page to list their services and advertise to the vendors for video generation.

For vendors who purchase premium options, this members listings page 1030 provides a link to a dedicated page for that vendor. The vendor may upload their full video or a link to their full video on their dedicated page, as well as other information. Their dedicated page is linked to their video clip in the category or categories they've chosen, so that end users may view a video clip and then click a link to the vendor's page where they can view the full video and other information. In some embodiments, the option to list the phone number may be available only to vendors who purchase premium options. The phone number in the vendor listing may be used directly for end users to vendors. In the case of the listing site being available to vendors without payment, all vendors would be able to list any information, including but not limited to their phone number.

The join page, 1040, allows vendors, end users and interviewers to join the site. Vendors join the site to list their videos. End users join the site to receive information and/or to save favorite videos. Interviewers join the site to offer their services to vendors or potential vendors. Joining the site may include providing a name, providing a name and email address, and/or providing other information, such as a phone number or other identifying information.

Each type of user, vendors, interviewers, and end users will be directed to a separate landing page. This page 1040 may also provide a number of subscription levels for vendors to use and may require payment to move forward with listing their videos. It may also require interviewers to pay to join the site.

Vendors, end users and interviewers are provided a link to a profile page. Vendors who choose to be on the listing site without premium options get a profile page that solely allows them to upload their video clip and name, and possibly other information. Those who choose the premium options and interviewers get links to the dedicated pages described above (1030).

The resources page 1050 may contain information for vendors and/or interviewers and/or end users, such as how to use the site, how to conduct an interview, etc.

The articles page 1060 may contain information vendors and/or interviewers and/or end users, such as articles written by vendors on best practices in their field, information for end users, etc.

The about page 1070 contains information about the presentation module, such as the team that developed it, etc.

The contact page 1080 contains contact information for the site administrators.

The member controls 1100 include actions vendors and/or interviewers and/or end users can access to manage their information on and/or associated with the listing site. The member controls pages are not public.

Login 1110 is for vendors, interviewers and end users who have created accounts and wish to access them. If they don't have an account, they may be prompted to create one.

Password recovery 1120 allows vendors, interviewers and end users who have created accounts to recover their password or create a new password.

Membership 1140 and signup 1150 allow vendors, interviewers and end users who have created accounts to register to be members of the presentation module.

Listing management 1160 allows vendors and interviewers with a listing on the listing site to edit their listing. This may involve, but is not limited to, removing the listing, changing the category, adding, deleting or changing information, uploading new videos or other media.

Public pages 1200 are the pages the end users see when they visit the listing site. They can filter the vendors using parameters such as but not limited to, business or entity type, number of positive reviews, and others. This yields the filtering results 1210. The filter may also contain a function for searching the listing site by entity name or other information.

The ratings/review page 1220 will access reviews of the vendors from the internet, preferably from Google Reviews or the most commonly used review sites. It may also access reviews of the interviewers.

The messaging page 1230 may allow for messaging between end users, vendors and interviewers.

The privacy page 1300 describes how the listing site handles end user, vendor, and interviewer information.

The accessibility page 1310 describes how the listing site is designed to conform to the Americans with Disability Act.

The terms and conditions/legal page 1320 describes the terms and conditions of using the listing site, presents a legal disclaimer, and other information.

The admin pages 1330 are for use by the listing site administrator.

Figure 2:
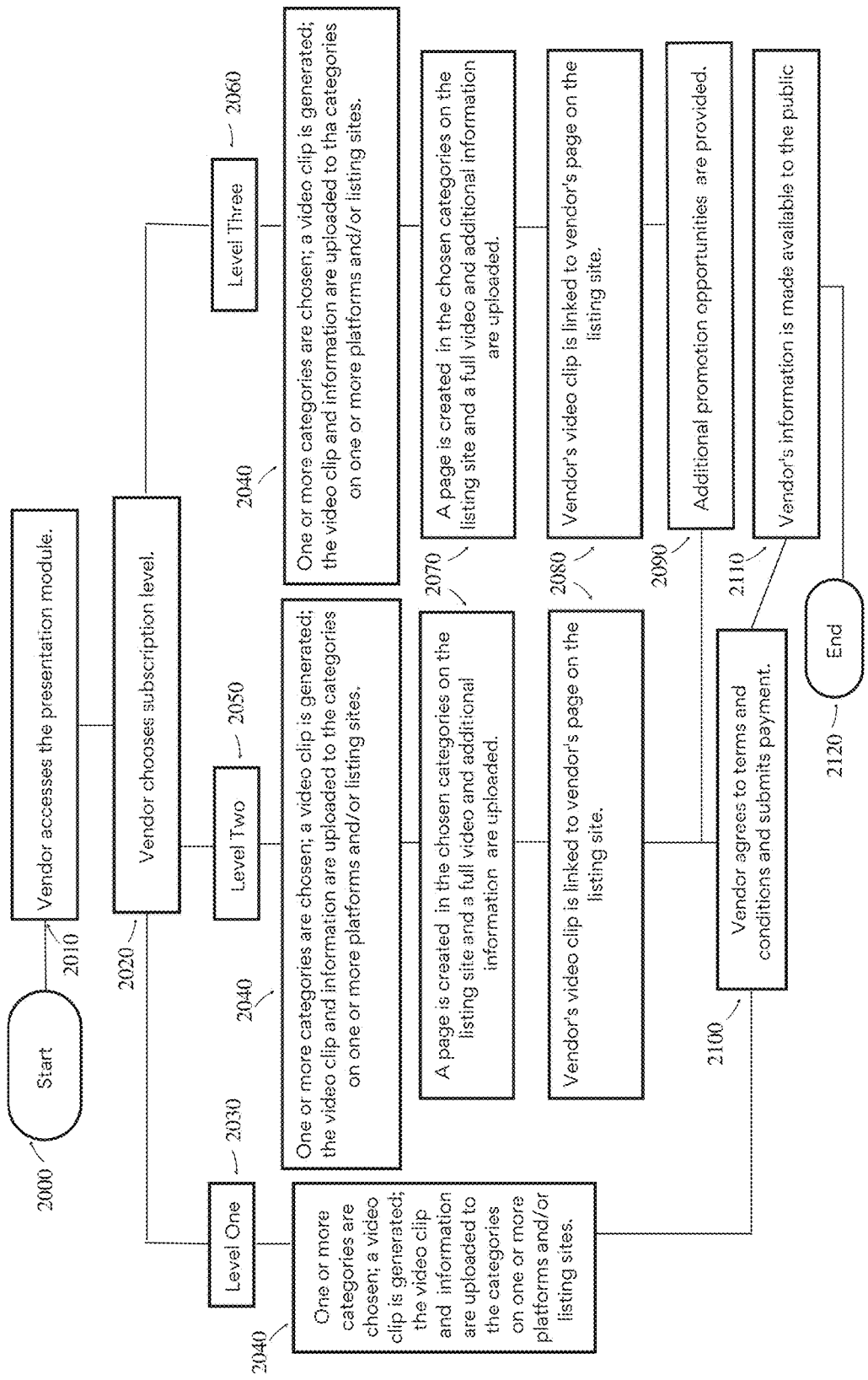
FIG. 2 shows the directory method overall video listing process.

FIG. 2 shows the preferred embodiment of the directory method overall video listing process. The process starts 2000 when a vendor discovers the presentation module and accesses it 2010. The vendor may discover the presentation module through a variety of ways, including but not limited to, through online searches, personal referrals. The presentation module may also be found by viewing advertisements, either online, in a print medium, or through other media such as, but not limited to, television.

The vendor chooses their subscription level 2020. In the preferred embodiment, there are three subscription levels, although there may be from one to fifty subscription levels. The level chosen determines how much information the vendor can add to the listing site.

An alternative embodiment would not require a subscription. In that embodiment, the vendor would join the listing site and would continue through selected steps.

If the vendor chooses level one 2030, they proceed to the next step 2040. One or more categories of businesses or entities are chosen and a video clip is generated. The video clip is from 1 to 120 seconds, in a preferred embodiment the video clip is 10-30 seconds long. The generation of the video clip includes generation of a thumbnail, which is a still image that acts as a preview image for the video. In the preferred embodiment, all of the thumbnails for the vendors employ the same template, with certain elements edited to represent the individual vendor. The video clip is uploaded to a platform, such as but not limited to Vimeo, and may be edited. The video clip is then downloaded from the platform onto the listing site directory page. The video clip may be uploaded to other platforms, such as but not limited to, YouTube, for SEO purposes. It may also be uploaded to other listing sites or may be linked to other listing sites or platforms.

If the vendor chooses level two 2050, they proceed to next step 2040 and conduct the activities outlined above. A dedicated page 2070 is created on the listing site for the vendor. A full video or a link to a full video is uploaded to the page with other information. In a preferred embodiment, the other information includes a full or partial transcript of the video. The full video is preferably 7-12 minutes long, but may be from 1-120 minutes. The full video or link may be uploaded from any platform that hosts videos. It may be a video that the vendor already owns or the vendor may choose the option to have a video created by one of the interviewers on the listing site or another interviewer, including software programs that conduct interviews as in FIG. 6.

After the full video is uploaded to the vendor's dedicated page, the vendor's video clip is linked to the vendor's page with an instruction to click the link to learn more, as shown in FIG. 4.

If the vendor chooses level three 2060, they follow the steps above for level two but they are given the opportunity to add more information and/or employ additional promotion opportunities 2090.

After a vendor has enacted the steps for their chosen level, they agree to terms and conditions and submit payment 2100. Vendors may pay different amounts for different levels, and there may be levels that don't require payment.

In an alternative embodiment, the vendor doesn't pay to use the listing site and may or may not choose a subscription level.

The vendor's information is then made available to the public 2110, and the process stops 2120. The process may be repeated if a vendor wishes to upload additional video clips.

Figure 3:
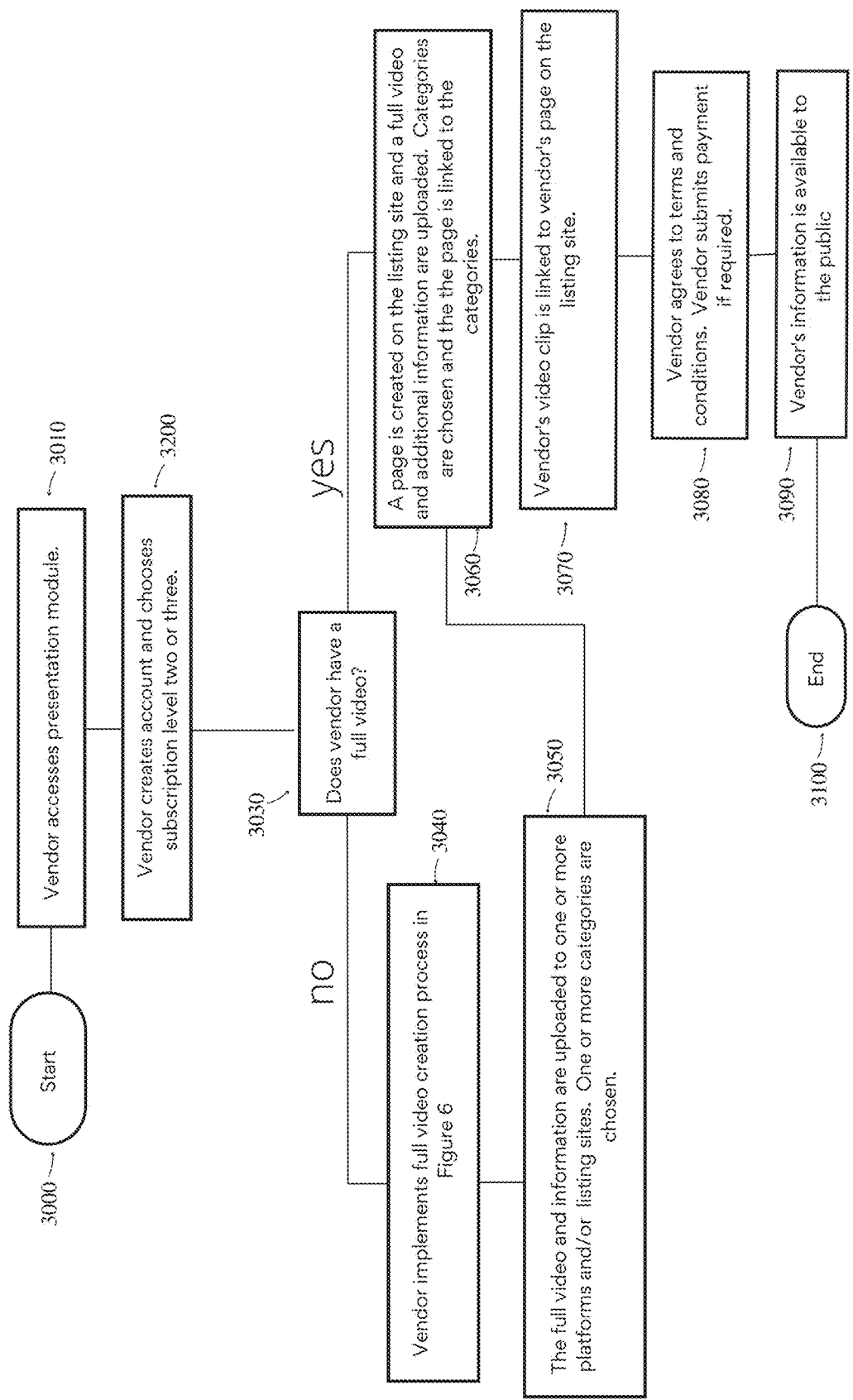
FIG. 3 shows the directory method full video listing process.

FIG. 3 shows the directory method full video listing process. The vendor starts the process 3000 by accessing the presentation module 3010. In one embodiment, the vendor creates an account and chooses subscription level two or three, premium options that allow them to upload a full video. The system prompts the vendor for their video, 3030.

If the vendor doesn't have a video, the system prompts them to create a video 3040 by following the process in FIG. 6. The full video is uploaded to one or more platforms and the listing site, and edited 3050. A thumbnail may be created. The vendor chooses which business or entity categories the full video fits, and selects the appropriate categories. The vendor proceeds to 3060. If the vendor already has a full video, they proceed directly to 3060.

A page is created, 3060, linked to the chosen categories on the listing site, and a full video and additional information are uploaded. The additional information may include, but is not limited to, a full video full or partial transcript, business information, and social media links. The vendor's video clip is linked to the vendor's page on the listing site 3070. The vendor agrees to terms and conditions and submits payment 3080. The vendor's information is made available to the public 3090 and the process ends 3100.

Although in this embodiment the vendor pays to use the presentation module, in an alternative embodiment the vendor would not pay and may or may not choose subscription levels.

In a further alternative embodiment, parts or all of the process may be automated using software. The process may also be enacted by an administrator using the vendor's information, in place of the vendor.

FIG. 4 shows a preferred embodiment of the directory method presentation module. This figure shows the directory page with the vendors' video clips presented on the listing site; different vendors have chosen different subscription levels. In this embodiment, the end user has chosen a category 4000, in this case technology, and a subcategory, 4005, in this case software developer. The end user may be able to search within the category using the search function 4007. The search may be done using dropdown choices and/or free hand. The search function may or may not be available in this part of the presentation module.

Lindsey Hart, Max Moto, and Lily Bell have chosen subscription level one 4010. Their video clips have been uploaded to the listing site from a platform. A user may view their video clips but access no other information about them on the listing site. In an alternative embodiment, additional information may be placed on the directory page of the listing site for these vendors.

All of the vendors on the site have a heart 4050 next to their video clip that may be clicked to save their video clip to an end user's favorites. The heart changes color to indicate that the vendor's information has been saved to the end user's account. In order for the end user to access this function, they may create an account. Lindsey Hart, Sean Black and Riki Bobbi have been saved to the end user's account as favorites. There may also be an indicator to remind the end user that they've viewed a vendor's video clip or full video.

Rikki Bobbi has chosen subscription level two 4030. In the embodiment shown, there is more information, in this case a phone number, and a link 4080 to her dedicated page on the listing site 4090. Her dedicated page may contain a full video and other information, such as but not limited to, a link to her website, social media links, other videos, written content about her business or entity, or other information. Her status as a saved favorite has been carried over from the directory page to her dedicated page.

Sean Black has chosen subscription level three 4040, the highest premium level. His video clip is shown on the directory page with additional information; in this case his website, phone number, and a brief description of his expertise. Other information may be placed with his video clip. This is in addition to the benefits for level two. He also may receive additional promotion opportunities through the presentation module, such as but not limited to, blog posting, premium placement, social media posts from the presentation module, and others.

Although the preferred embodiment is a subscription model for monetization of the presentation module, other monetization models may be used in conjunction with the subscription module or separately. For instance, vendors may be able to upload their video clips for free, have a dedicated page for free, and/or access additional promotion opportunities for free. The presentation module may be monetized through other methods, including but not limited to, purchased advertising on the listing site, strategic partnerships, affiliate marketing, and/or sponsorships.

FIG. 5 shows the directory method full video interview process. The interview process contains questions based on key words attributable to a website of the presenting vendor or other media described in FIG. 6.

The process starts 5000 when the vendor accesses the presentation module 5010. The option is chosen to record a full video 5020. In the preferred embodiment, the option is a feature on the presentation module and preferably on the listing site.

The vendor is presented with the choice 5030 of a person interviewer 5040 or a mobile or web-based application 5080 as the interviewer. If desired, the vendor may access the full video script generated in FIG. 6 and use that as a script for the person interviewer or the application to conduct the interview.

If a person interviewer is chosen, the vendor chooses the interviewer 5050. The vendor may choose from a number of different interviewers on the listing site. The interviewers each have their own page on the listing site with information, with the option to post a video of themselves. The video may be of the interviewer conducting an interview to showcase their skills.

The vendor may access the interview for a full video option in a different place on the internet, for instance on, but not limited to, a separate website, a social media site, or other internet platform or site. For instance, it may be available on a human interviewer's website or on an affiliate site. The interview is scheduled.

The human interviewer conducts the interview with the vendor either in person or using remote recording software, either using the video script generated in FIG. 6, using a different set of questions, or using a combination of the video script from FIG. 6 and other questions. The vendor may review the full video and request edits or a re-do until they are satisfied with their full video. The process ends 5070 and the full video may be added to the listing site or used elsewhere.

If the vendor chooses to use a mobile or web-based application 5080 to generate their full video, they access the software and record an interview as a full video 5090. The app preferably uses the video script generated in FIG. 6, but may use questions obtained elsewhere or entered by the vendor. The vendor may also be given the option to choose a number of questions from a list that has been pre-programmed into the mobile or web-based application. The vendor may record the full video numerous times until they are satisfied with it, then the process ends 5100 and the full video may be added to the listing site or elsewhere.

The mobile or web-based application may employ an avatar to ask questions, may have questions appear on a screen, or may employ another method for presenting questions to the vendor.

FIG. 6 shows the directory method full video script generation process. In this figure, the vendor has already accessed the presentation module and has chosen an option to record a full video. In a preferred embodiment, the option may be accessed using resources provided on the presentation module, but it may be accessed separately in one or more places, either in addition to or in place of the presentation module.

The vendor starts the process 6000 by providing the media content sites where their content resides 6010. These sites may be a website, a social media account, such as, but not limited to, Instagram, Facebook, LinkedIn, YouTube or other video account, or any other place where the content describing their entity resides. The vendor may also provide the parameters on their target demographic or other information.

The vendor is classified into a given vendor type, and media sites 6020 are analyzed for key words and key phrases that are present in the content sites the vendor has provided. Alternately, the vendor can submit just the name of the entity, the given vendor type can be determined, and the media sites to be analyzed can be determined using that. The functions above can be done manually or by a software program. Other aspects of the vendor's business or entity may be determined using analytics such as but not limited to Google analytics, for information such as but not limited to, the demographic the vendor is targeting, where their visitors are conducting searches, etc.

The key words and key phrases identified in 6020 are used to search media and search engines for questions using the key words and key phrases. Searches may be done of media and search sites, including but not limited to, voice search sites, and typed search sites on the major platforms of the time, such as but not limited to, Google, Yahoo, Bing, Alexa, Siri, YouTube, Wikipedia, Amazon, Facebook, LinkedIn, Reddit, Instagram, Twitter, and any sites where questions are posed expecting an answer. The search may target the sites that are most relevant to the keywords and phrases from the vendor's site; for instance, if a vendor is selling surfboards, the search may preferentially target sites like YouTube and Reddit for questions, as opposed to searching LinkedIn and Google for questions related to business coaching key words and phrases. Alternately, the search may target all of the major sites but give more weight to answers on sites that correspond more closely to the demographic being targeted by the vendor and/or are where the vendor's site visitors most frequently visit, among other parameters determined by analytics of their site.

The questions are ranked 6040 according to a system and the highest ranked questions are identified and chosen. In a preferred embodiment, between 1 and 20 questions are chosen, and in a more preferred embodiment between 3 and 10 questions are chosen. The weighting system may involve giving the most 'points' to the most frequently asked questions containing the key questions and phrases on the top three search sites, and may award 'points' based on other parameters, such as but not limited to, match to the user's target demographic, etc. on the top three sites and other sites that are relevant. In a preferred embodiment, the software would search 1-300 sites for questions.

A full video script 6050 is generated using the identification of the highest ranked questions and/or questions based on the key words and phrases. The interview process contains questions based on an identification of highest ranked questions for a given vendor type derived from at least one of search engines queries and media. The script is conveyed to an interviewing app or to a human interviewer. Clips of the highest ranked key questions and phrases and/or the video clips may also be used for marketing on sites, such as but not limited to, websites (for instance, as Frequently Asked Questions), social media sites and other sites where questions are asked expecting an answer.

Search engine queries are the questions that end users type into search engines such as Google or ask voice based platforms such as Alexa.

FIG. 7 shows the directory method full video transcription process. In a preferred embodiment, after a vendor has recorded a full video, the transcription process 7000 starts, and the full video is transcribed. The full video is accessed 7010 and may be transcribed manually, through use of a software program, or by a combination 7020. In a preferred embodiment, the transcript is uploaded in full or part to the vendor's page on the listing site with their full video. It may also be used on the platform and associated there with the vendor's full video. The transcript may be edited 7030, either manually, by software, or by a combination.

The transcript may be uploaded 7040 to one or more platforms and/or listing sites in full with the corresponding full video, or may be edited to extract portions, preferably the highest ranked questions and answers that were included in the video script of FIG. 6, and the process ends 7050.

FIG. 8 shows the directory method interview skill training application. The vendor starts the process 8000 by accessing the presentation module 8005. The vendor chooses the option for interview skills training 8010. In a preferred embodiment, the option may be accessed using resources provided on the presentation module, but it may be accessed separately in one or more places, either in addition to or in place of the presentation module.

The vendor accesses a mobile or web-based application 8020, and the vendor gives the command to start the interview 8030. The questions used in the application may be determined a number of ways, including but not limited to, the application may contain pre-set questions, the vendor may add their own questions, or other ways. If the application contains pre-set questions, the vendor may use them all or there may be an option to choose certain questions.

The application uses a script to interview the vendor using a video recording device and may or may not record the interview 8040. The script may be generated using the process in FIG. 6, or may be a generic script appropriate for any vendor. During the interview the application gives the vendor feedback 8050, such as 'smile here' or 'eliminate filler word', etc. The feedback may be given as a verbal command, as words on the screen, or by other methods. If the vendor has chosen to record the interview, the feedback is available on the recording. The application may also give the vendor additional feedback at the end of the interview, as well as an interview score. The vendor may use the interview score to gauge how well their performance is improving from interview to interview.

The vendor repeats steps 8030 through 8050 until they're satisfied with the interview and the process ends 8070. At this point, the vendor may choose to record a full interview for the presentation module if they haven't used the full video interview script from FIG. 6 already.

FIG. 9 shows the directory method interview skill training application with an interview application. In a preferred embodiment, the interview skill training application 9000 is on web-based device, such as but not limited to, a desktop or laptop computer, and the interview application 9020 is on a mobile device, such as but not limited to, a mobile phone 9030. The vendor can use the applications in conjunction. A question is asked on the mobile device and the vendor uses the video recording software for the interview application on a web-based device. As the vendor 9010 answers the questions, the web-based application prompts them to improve their skills with specific commands, such as smile 9040. The vendor may record the interview 9050 to review later, but can use the applications without recording.

The questions may be from the script may be generated using the process in FIG. 6, or may be a generic script appropriate for any vendor.

Although this invention has been described with a certain degree of particularity, it is to be understood that the present disclosure has been made only by way of illustration and that numerous changes in the details of construction and arrangement of parts may be resorted to without departing from the spirit and the scope of the invention.

We claim:

1. A video hosting platform, which hosts web accessible videos promoting venders to users, comprising:
    a listing website organized into a directory format by business type, said listing website comprising:
        a directory page listing a plurality of selectable categories, each being a business type;
        a set of category pages, each listing a plurality of venders, wherein each listed vender is linked to a vender specific one of a set of dedicated vender web pages;
        the set of the dedicated vender web pages comprising a plurality of interview based videos viewable by the users;
        a presentation module, implemented by a computing device comprising at least a graphical user interface (GUI) and a processor, the presentation module configured to:
            create one of the dedicated vender web pages for the accessing vender when one has not been previously created;
            generate a script for a new one of the interview based videos that is accessible via the accessing vender's vender specific web page, said script generation comprising:
                receive from the accessing vender a social media content site where vender content resides, said social media content site being one of a web site for the accessing vender and a social media account for the accessing vender;
                extract keywords and key phrases from content retrieved from the social media content site using a natural language processing (NLP) algorithm executed by the processor;

search, using the processor, a plurality of external media platforms and search engines for questions containing the extracted keywords and key phrases;

rank the retrieved questions based on relevance and frequency of occurrence using a weighting algorithm to generate a prioritized list of interview questions;

generate a plurality of interview questions from the social media content site;

utilize the generated interview questions, which the vender answers on video to create one of the interview based videos of the accessing vender's vender specific web page;

automatically tag the video with metadata corresponding to the extracted keywords and ranked questions to optimize searchability and retrieval within the platform; and analyze the video using a feedback application executed by the processor to provide real-time presentation improvement prompts to the vendor during video recording, including at least one of facial expression feedback, speech clarity analysis, or a filler word reduction suggestion.

2. The video hosting platform of claim 1, wherein between 1 and 20 questions are generated by the presentation module.

3. The video hosting platform of claim 2, wherein between 3 and 10 questions are generated by the presentation module.

4. The video hosting platform of claim 1, wherein each of the interview based videos is a video clip between 5 and 120 seconds in length.

5. The video hosting platform of claim 1, wherein the interview questions for at least a portion of the interview based videos are asked by a human interviewer, which is selected from a listing of candidates presented via the presentation module to the accessing vender.

6. The video hosting platform of claim 4, wherein the video clips are classified by business type on the listing website.

7. The video hosting platform of claim 1, wherein the interview questions for at least a portion of the interview based videos are asked by a non-human web-based application provided via the presentation module to the accessing vender answering the interview.

8. The video hosting platform of claim 7, wherein the non-human web-based application uses an avatar to ask the interview questions.

9. The video hosting platform of claim 1, wherein part or all of the interview based videos are transcribed to create transcriptions, and wherein the transcriptions are placed on the listing website.

10. The video hosting platform of claim 9, wherein each transcription is uploaded to the listing website with a corresponding interview based video.

11. The video hosting platform of claim 1, wherein at least a portion of the interview questions are based on an identification of highest ranked questions for a given vender type derived from search engines queries.

12. The video hosting platform of claim 1, wherein at least a portion of the interview questions are based on key words attributable to the social media content site.

13. The video hosting platform of claim 1, wherein the interview based video is conducted with the vender via a mobile application.

14. The video hosting platform of claim 7, wherein the non-human web-based application has the interview questions appear on a screen viewable by the accessing vender.

15. The video hosting platform of claim 1, further comprising:
a training application configured to teach interview skills to venders.

16. The video hosting platform of claim 15, wherein the training application is incorporated into an interview application.

17. A method for creating vender specific, interview-based videos based on a generated script customized by social media content of the vender, said method comprising:

accessing a video hosting platform via a network, the platform implemented on a computing system comprising at least a graphical user interface (GUI) and a processor configured to execute specialized content management applications;

determining, at the video hosting platform, that an accessing vender is a vender that lacks a dedicated web page that is accessible from a website;

generating, at the video hosting platform, a script for an interview based video, said script generation comprising:

receiving from the accessing vender a social media content site where vender content resides, said social media content site being one of a web site for the accessing vender and a social media account for the accessing vender;

extracting keywords and key phrases from content retrieved from the social media content site using a natural language processing (NLP) algorithm executed by the processor to analyze and classify vendor content;

searching, using the processor, a plurality of external media platforms and search engines for questions containing the extracted keywords and key phrases;

ranking the retrieved questions based on relevance and frequency of occurrence using a weighting algorithm to generate a prioritized list of interview questions for script customization; and creating, at the video hosting platform, an interview based video that utilizes the generated and ranked interview questions, which the vender answers on the interview based video; and automatically tagging the video with metadata corresponding to the extracted keywords and ranked questions to optimize searchability and retrieval within the platform;

analyzing, using the processor, the recorded interview-based video with a real-time feedback application to provide presentation improvement prompts during video recording, including at least one of facial expression feedback, speech clarity analysis, or a filler word reduction suggestion; and creating, at the video hosting platform, a vender specific dedicated Web page accessible from the web site, wherein the created vender specific dedicated Web page comprises the interview based video and associated metadata to improve content discoverability and retrieval efficiency.

18. A video hosting platform for generating and presenting scripted vender videos within dedicated vender websites:
a listing website comprising:
a set of the dedicated vender web pages comprising a plurality of interview based videos viewable by users accessing the dedicated vender web pages;

a module, comprising code stored on the video hosting platform, said code being executable by a processor of the video hosted platform, said code, when the video hosted platform is accessed by one of the venders and when the code is executed, being configured to:
create one of the dedicated vender web pages for an accessing vender when one has not been previously created;
generate a script for a new one of the interview based videos that is accessible via the accessing vender's vender specific web page, said script generation comprising:
  receive from the accessing vender a social media content site where vender content resides, said social media content site being one of a web site for the accessing vender and a social media account for the accessing vender;
  extract keywords and key phrases from content retrieved from the social media content site using a natural language processing (NLP) algorithm executed by the processor to analyze and classify the vendor content;
  search, using the processor, a plurality of external media platforms and search engines for questions containing the extracted keywords and key phrases;
  rank the retrieved questions based on relevance and frequency of occurrence using a weighting algorithm to generate a prioritized list of interview questions;
  utilize the generated interview questions, which the vender answers on video to create one of the interview based videos for the accessing vendor's vendor-specific web page;
  automatically tag the video with metadata corresponding to the extracted keywords and ranked questions to optimize searchability and retrieval within the platform;
  analyze the recorded video using a feedback application executed by the processor to provide real-time presentation improvement prompts to the vendor during video recording, including at least one of facial expression feedback, speech clarity analysis, or a filler word reduction suggestion; and
  add the created interview-based video to the created dedicated vendor web page for the accessing vendor, with the associated metadata enabling improved indexing and user-specific content retrieval through advanced search functions.

19. A video hosting platform configured to generate scripts guiding venders producing video content for the video hosting platform, said video hosting platform comprising:
a module, comprising code stored on the video hosting platform and executable by a processor, the module, when accessed by a vender is configured to:
generate a script for a new interview based video, said script generation comprising:
  receive from the vender a social media content site where vender content resides, said social media content site being one of a web site for the accessing vender and a social media account for the vender;
  extract keywords and key phrases from content retrieved from the social media content site using a natural language processing (NLP) algorithm executed by the processor to analyze and classify the vendor content;
  search, using the processor, a plurality of external media platforms and search engines for questions containing the extracted keywords and key phrases;
  rank the retrieved questions based on relevance and frequency of occurrence using a weighting algorithm to generate a prioritized list of interview questions;
  automatically generate the script based on the prioritized list of interview questions and associate metadata with the script for optimized retrieval and content classification within the platform;
  store the script in a searchable database optimized for keyword and metadata-based retrieval to enhance system performance; and
  convey the script to the vendor via a user interface that provides real-time suggestions and modifications based on the vendor's selected content preferences and target audience.

20. A method for generating questions used in video production, said questions being based upon social media content of the vender, said method comprising:
accessing a video hosting platform via a network, the video hosting platform implemented on a computing system comprising at least a processor and a graphical user interface (GUI);
receiving, at the video hosting platform, from an accessing vender a social media content site where vender content resides, said social media content site being one of a web site for the accessing vender and a social media account for the accessing vender;
receiving, at the video hosting platform, from an accessing vender a social media content site where vender content resides, said social media content site being one of a website for the accessing vender and a social media account for the accessing vendor;
extracting keywords and key phrases from content retrieved from the social media content site using a natural language processing (NLP) algorithm executed by the processor to analyze and classify the vendor content;
searching, using the processor, a plurality of external media platforms and search engines for questions containing the extracted keywords and key phrases to identify frequently asked and highly relevant questions;
ranking the retrieved questions based on relevance and frequency of occurrence using a weighting algorithm executed by the processor to generate a prioritized list of interview questions;
automatically associating metadata with the generated interview questions to enhance searchability and future retrieval within the video hosting platform;
conveying the prioritized and metadata-tagged interview questions over the network for presentation on a vendor device through which the vendor interacts with the video hosting platform, wherein the GUI provides real-time suggestions and allows the vendor to select or modify the questions based on content preferences and target audience.

* * * * *